United States Patent [19]
Hanamura

[11] Patent Number: 5,771,757
[45] Date of Patent: Jun. 30, 1998

[54] CLIPLESS BICYCLE PEDAL WITH LARGE SHOE-CONTACTING AREA

[75] Inventor: Junichi Hanamura, Sakai, Japan

[73] Assignee: Shimano, Inc., Osaka, Japan

[21] Appl. No.: 864,436

[22] Filed: May 28, 1997

Related U.S. Application Data

[63] Continuation of Ser. No. 588,660, Jan. 19, 1996, abandoned.

[51] Int. Cl.⁶ .................................................. G05G 1/14
[52] U.S. Cl. .......................................... 74/534.4; 74/534.6
[58] Field of Search ............................. 74/594.4, 594.6; 36/131

[56] References Cited

U.S. PATENT DOCUMENTS

| | | | |
|---|---|---|---|
| 546,412 | 9/1895 | Bevin | 74/594.6 |
| 559,952 | 5/1896 | Robertson | 74/594.6 |
| 565,788 | 8/1896 | Otis | 74/594.6 |
| 597,830 | 1/1898 | Herrick | 74/594.6 |
| 4,807,372 | 2/1989 | McCall | 36/131 |
| 5,003,841 | 4/1991 | Nagano | 74/594.6 |
| 5,115,692 | 5/1992 | Nagano | 74/594.4 |
| 5,203,229 | 4/1993 | Chen | 74/594.6 |
| 5,259,270 | 11/1993 | Lin | 74/594.6 |
| 5,377,561 | 1/1995 | Danieli et al. | 36/131 X |
| 5,423,233 | 6/1995 | Peyre et al. | 74/594.6 |

FOREIGN PATENT DOCUMENTS

| | | |
|---|---|---|
| 0 428 140 B1 | 5/1991 | European Pat. Off. . |
| 0 516 013 A2 | 12/1992 | European Pat. Off. . |
| 0557735 | 9/1993 | European Pat. Off. ............. 74/594.6 |
| 0 753 454 A1 | 1/1997 | European Pat. Off. . |
| 60-13883 | 1/1985 | Japan . |
| 60-22488 | 2/1985 | Japan . |
| 60-51198 | 4/1985 | Japan . |
| 60-99188 | 7/1985 | Japan . |
| 3-28992 | 3/1991 | Japan . |
| 4-128996 | 11/1992 | Japan . |
| 4-137993 | 12/1992 | Japan . |
| 4-372486 | 12/1992 | Japan ................................... 74/594.6 |
| 186440 | 10/1922 | United Kingdom .................. 74/594.6 |

*Primary Examiner*—Vinh T. Luong
*Attorney, Agent, or Firm*—James A. Deland

[57] ABSTRACT

A bicycle pedal includes a clamping unit rotatable about an axle for engaging a cleat of a bicycle shoe. A first sole engaging member for engaging a sole of the bicycle shoe is disposed at a side of the clamping unit and has an opening for receiving the axle therethrough, and a second sole engaging member for engaging the sole of the bicycle shoe is disposed at an opposite side of the clamping unit.

28 Claims, 2 Drawing Sheets

CLIPLESS BICYCLE PEDAL WITH LARGE SHOE-CONTACTING AREA

This is a Continuation of application Ser. No. 08/588,660, filed Jan. 19, 1996, now abandoned.

BACKGROUND OF THE INVENTION

The present invention is directed to bicycle pedals and, more specifically, to a bicycle pedal of the type having a clamping unit for clamping a cleat affixed to a sole of a bicycle shoe.

FIG. 1 shows a prior art clipless bicycle pedal (10). Pedal (10) includes a body (14) with side portions (18,22). Body (14) is rotatably supported on an axle (26) which is fastened to a crank arm (30). A clamping unit (34) is disposed on body (14) for clamping a cleat affixed to a bicycle shoe (not shown) on the pedal (10). Pedal (10) is very useful to maximize pedaling efficiency by fixing the cyclist's foot in the proper location on the pedal and by allowing the cyclist to apply pedaling force in the upward as well as the downward direction.

Pedal (10) typically has been used with many types of bicycles, and they operate quite well with bicycles intended for road use. Pedal (10) also may be used for mountain bicycles and other bicycle designed for off-road use. However, off-road bicycle riding has its own characteristics that differ from ordinary road riding. For example, the cyclist's foot must usually be detached from the clamping unit (34) much more frequently during off-road riding than with road riding. Furthermore, when riding in difficult or steep terrain, it is often desirable to use pedal (10) without clamping the shoe to the pedal Unfortunately, when used in this manner the side portions (18,22) of pedal (10) do not provide enough contact surface for effective pedaling, especially since great pedaling forces often must be applied. Consequently, the cyclist must either pedal more gently, or else the cyclist must use a pedal without a clamping unit. Neither option is very desirable for high-performance riders.

SUMMARY OF THE INVENTION

The present invention is directed to a clipless bicycle pedal with a large shoe contacting area to allow the cyclist to enjoy the benefit of clipless bicycle pedals during normal riding conditions, but with the benefit of a large shoe-contacting area when riding on difficult terrain. That is, the cyclist may lock the bicycle shoe to the pedal when rough riding is not required, and then disengage the bicycle shoe from the pedal and pedal on a large contact surface when rough terrain is encountered.

In one embodiment of the present invention, a bicycle pedal includes a clamping unit rotatable about an axle for engaging a cleat of a bicycle shoe. A first sole engaging member for engaging a sole of the bicycle shoe is disposed at a side of the clamping unit and has an opening for receiving the axle therethrough, and a second sole engaging member for engaging the sole of the bicycle shoe is disposed at an opposite side of the clamping unit. Such sole engaging members may be added to existing off-the-shelf clamping units, or they may be incorporated into the pedal design.

In a more specific embodiment, the first and second sole engaging members may extend beyond the front and rear sides of the clamping unit to increase the shoe contacting area and to further facilitate use with off-the-shelf clamping units. The first and second sole engaging members also may include lateral outer sides which taper inwardly from central portions thereof to follow the contour of the cyclist's shoe, thus maxing the shoe contacting area while minimizing the size of the overall pedal assembly. The first and second sole engaging members may include lateral inner sides which extend in a substantially straight line from the middle portion and generally perpendicular to the axle to further increase the shoe contacting area. If desired, bridging members may be attached to the front and/or rear portions of the first and second sole engaging members to increase rigidity and provide additional traction surfaces. The entire assembly may be detachably connected so that the pieces may be disassembled and used with another clamping unit.

DETAILED DESCRIPTION OF THE EMBODIMENTS

Figure 1:
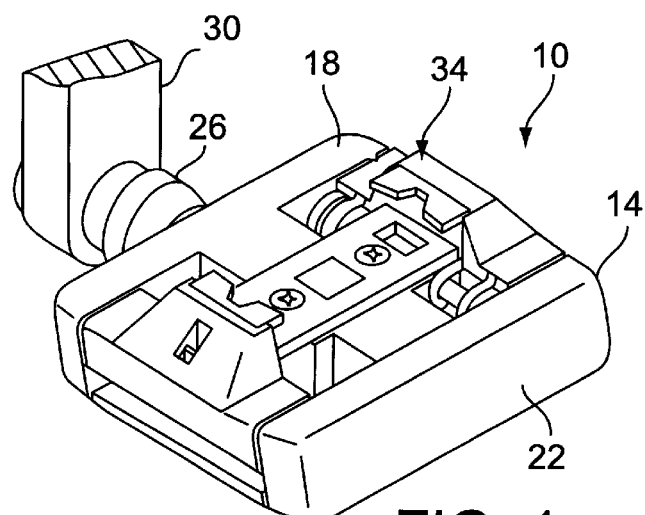
FIG. 1 is a perspective view of a prior art bicycle pedal of the type having a clamping unit for clamping a cleat for a bicycle shoe.
Figure 2:
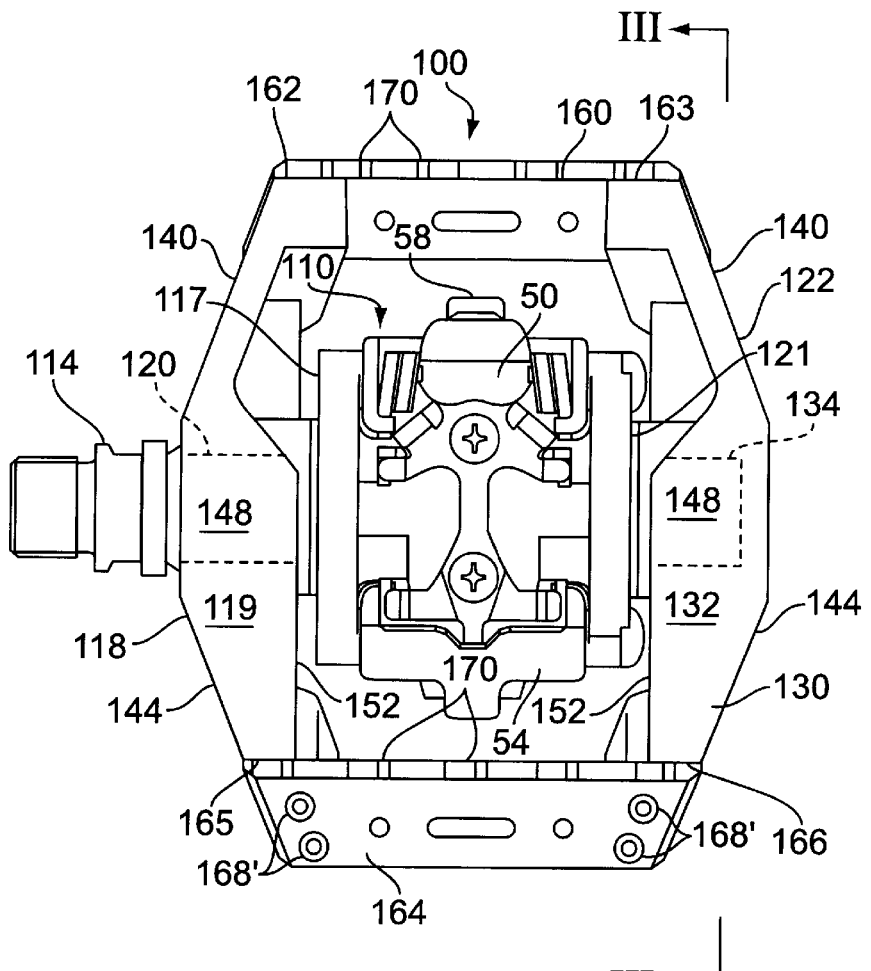
FIG. 2 is a top view of a particular embodiment of a bicycle pedal according to the present invention.
Figure 3:
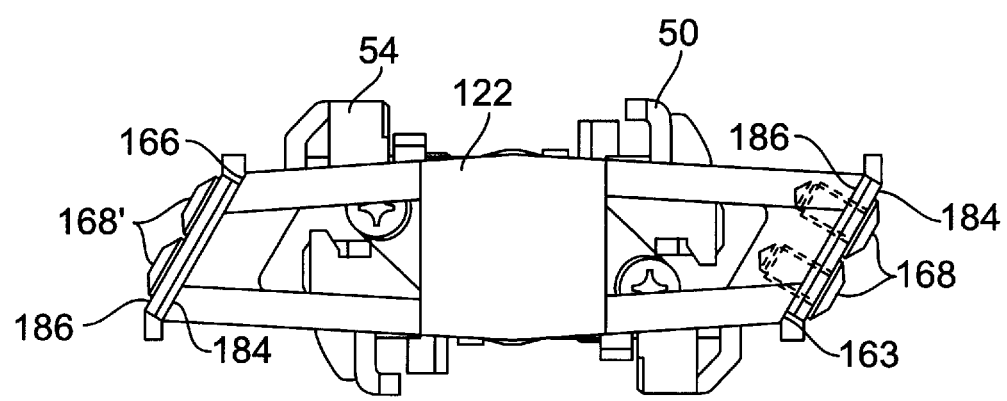
FIG. 3 is a view of the pedal taken along line III—III in FIG. 2.

FIG. 2 is a top view of a particular embodiment of a bicycle pedal (100) according to the present invention. Pedal (100) includes a clamping unit (110) rotatable about an axle (114) and having a front cleat engaging member (50) and a rear cleat engaging member (54) that face each other. For engaging a cleat of a bicycle shoe (not shown). A first sole engaging member (118) having a first sole engaging surface (119) for engaging a sole of the bicycle shoe is attached to an external lateral side (117) of the clamping unit (110). First sole engaging member (118) has a first opening (120) for receiving the axle (114) therethrough. A second sole engaging member (122) having a second sole engaging surface (132) for engaging the sole of the bicycle shoe is attached to an opposite external lateral side (121) of the clamping unit (110). In this embodiment, second sole engaging member (122) includes a blind second opening (134) for receiving axle (114) therein. Of course, in some embodiments second opening (134) may extend entirely through second sole engaging member (122). Alternatively, second opening (134) may be omitted, and second sole engaging member (122) may be bonded to external lateral side (121) of clamping unit (110) or otherwise affixed to the external lateral side (121) of clamping unit (110) directly.

In this embodiment, first and second sole engaging members (118,122) each have lateral outer sides (140,144) which taper inwardly from a central portion (148) thereof. Furthermore, first and second sole engaging members (118, 122) each include a lateral inner side (152) having a portion which extends in a substantially straight line from the central portion (148) and generally perpendicular to the axle (114). This construction increases the sole contacting area while minimizing the overall size of the pedal assembly by generally following the contour of the bicycle shoe. The surfaces (119,132) are shown as being parallelogram shaped, but other shapes may be employed depending upon the application.

To further increase the shoe contacting area and to allow the first and second sole engaging members (118,122) to be used with existing clipless pedals, the front and rear portions of the first and second sole engaging members (118,122) extend beyond the front and rear (58,62), respectively sides of clamping unit (110). This structure also increases the amount of fore and aft contact with the bicycle shoe for added stability.

To facilitate manufacture and interchangeability of the parts, first sole engaging member (118) is shaped symmetrically to second sole engaging member (122), and the top portion of each sole engaging member is shaped the same as the inverted bottom portion of that sole engaging member. In other words, if pedal (100) were rotated 180°, the sole engaging members (118,122) in this rotated position would look the same as shown in FIG. 2.

A bridge member (160) is mounted to respective front facing surfaces (162,163) of sole engaging members (118, 122) through screws (168), and a second bridge member (164) is mounted to the respective rear facing surface (165,166) of sole engaging members (118,122) through screws (168). In this embodiment, first and second bridge members (160,164) are formed as first and second generally flat plate-shaped members having traction projections (170). Of course, first and second bridge members (160,164) may be mounted to first and second sole engaging members (118,122) in many ways, such as by an adhesive, etc. Both first and second bridge members (160,164) have the same shape to facilitate manufacturing and interchangeability, but again that is not necessary.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims.

What is claimed is:

1. A bicycle pedal comprising:

an axle;

a cleat clamping unit mounted to the axle for rotation about the axle;

a first sole engaging member having a first sole engaging surface, the first sole engaging member being disposed at an external side of the clamping unit and having a first opening for receiving the axle therethrough;

a second sole engaging member formed separately from the first sole engaging member and having a second sole engaging surface, the second sole engaging member being disposed at an opposite external side of the clamping unit;

a first bridge member formed separately from the first sole engaging member and the second sole engaging member, wherein the first bridge member is mounted by first screws to a front surface of the first sole engaging member that faces in a forward direction and to a front surface of the second sole engaging member that faces in the forward direction, and wherein the first bridge member has a rear first bridge member surface that faces the front surface of the first sole engaging member that faces in the forward direction and the front surface of the second sole engaging member that faces in the forward direction; and a second bridge member formed separately from the first sole engaging member, the second sole engaging member and the first bridge member, wherein the second bridge member is mounted by second screws to a rear surface of the first sole engaging member that faces in a rearward direction and to a rear surface of the second sole engaging member that faces in the rearward direction, and wherein the second bridge member has a front second bridge member surface facing the rear surface of the first sole engaging member that faces in the rearward direction and the rear surface of the second sole engaging member that faces in the rearward direction.

2. The pedal according to claim 1 wherein the first sole engaging member is shaped symmetrically to the second sole engaging member.

3. The pedal according to claim 1 wherein the first bridge member is formed as a first flat plate-shaped member having a front first bridge member surface parallel to the rear first bridge member surface, and wherein the second bridge member is formed as a second flat plate-shaped member having a rear second bridge member surface parallel to the front second bridge member surface.

4. The pedal according to claim 1 wherein the first bridge member and the second bridge member have the same shape.

5. The pedal according to claim 1 wherein the first sole engaging member and the second sole engaging member each have a lateral outer side which tapers inwardly from a central portion thereof.

6. The pedal according to claim 5 wherein the first sole engaging member and the second sole engaging member each include a lateral inner side having a portion which extends in a straight line from the central portion and perpendicular to the axle.

7. The pedal according to claim 1 wherein the first sole engaging member is disposed at a lateral side of the clamping unit and extends beyond front and rear sides of the clamping unit so that the first sole engaging surface extends in front of and behind the axle to the first and second bridge members, and wherein the second sole engaging member is disposed at an opposite lateral side of the clamping unit and extends beyond the front and rear sides of the clamping unit so that the second sole engaging surface extends in front of and behind the axle to the first and second bridge members.

8. The pedal according to claim 1 wherein the second sole engaging member includes a second opening for receiving the axle therein.

9. A bicycle pedal comprising:

an axle;

a cleat clamping unit mounted to the axle for rotation about the axle;

a first sole engaging member having a first sole engaging surface, the first sole engaging member being disposed at an external side of the clamping unit and having a first opening for receiving the axle therethrough;

a second sole engaging member formed separately from the first sole engaging member and having a second sole engaging surface, the second sole engaging member being disposed at an opposite external side of the clamping unit;

a first bridge member formed separately from the first sole engaging member and the second sole engaging member, wherein the first bridge member is mounted to a front surface of the first sole engaging member that faces in a forward direction and to a front surface of the second sole engaging member that faces in a forward direction, wherein the first bridge member has a front first bridge member surface parallel to a rear first bridge member surface, and wherein the rear first bridge member surface faces the front surface of the first sole engaging member that faces in the forward direction and the front surface of the second sole engaging member that faces in the forward direction; and a second bridge member formed separately from the first sole engaging member, the second sole engaging member and the first bridge member, wherein the second bridge member is mounted to a rear surface of the first sole engaging member that faces in a rearward direction and to a rear surface of the second sole engaging member that faces in a rearward direction, wherein the second bridge member has a front second bridge member surface parallel to a rear second bridge member surface, and wherein the front second bridge member surface faces the rear surface of the first sole engaging member that faces in the rearward direction and the rear surface of the second sole engaging member that faces in the rearward direction.

10. The pedal according to claim 9 wherein the cleat clamping unit includes a front cleat engaging member and a rear cleat engaging member, wherein the front cleat engaging member and the rear cleat engaging member face each other.

11. The pedal according to claim 10 wherein the cleat clamping unit is surrounded by the first sole engaging member, the second sole engaging member, the first bridge member and the second bridge member.

12. The pedal according to claim 9 wherein the first bridge member is mounted by first fasteners to the first sole engaging member and to the second sole engaging member, and wherein the second bridge member is mounted by second fasteners to the first sole engaging member and to the second sole engaging member.

13. The pedal according to claim 9 wherein the first bridge member is mounted by first screws extending through the front surface of the first sole engaging member that faces in the forward direction and through the front surface of the second sole engaging member that faces in the forward direction, and wherein the second bridge member is mounted by second screws extending through the rear surface of the first sole engaging member that faces in the rearward direction and through the rear surface of the second sole engaging member that faces in the rearward direction.

14. The pedal according to claim 9 wherein the first sole engaging member is shaped symmetrically to the second sole engaging member.

15. The pedal according to claim 9 wherein the first bridge member is formed as a first flat plate-shaped member, and wherein the second bridge member is formed as a second flat plate-shaped member.

16. The pedal according to claim 9 wherein the first bridge member and the second bridge member have the same shape.

17. The pedal according to claim 9 wherein the first sole engaging member and the second sole engaging member each have a lateral outer side which tapers inwardly from a central portion thereof.

18. The pedal according to claim 17 wherein the first sole engaging member and the second sole engaging member each include a lateral inner side having a portion which extends in a straight line from the central portion and perpendicular to the axle.

19. The pedal according to claim 9 wherein the first sole engaging member is disposed at a lateral side of the clamping unit and extends beyond front and rear sides of the clamping unit so that the first sole engaging surface extends in front of and behind the axle to the first and second bridge members, and wherein the second sole engaging member is disposed at an opposite lateral side of the clamping unit and extends beyond the front and rear sides of the clamping unit so that the second sole engaging surface extends in front of and behind the axle to the first and second bridge members.

20. The pedal according to claim 9 wherein the cleat clamping unit includes a front cleat engaging member and a rear cleat engaging member, wherein the front cleat engaging member and the rear cleat engaging member face each other.

21. The pedal according to claim 20 wherein the cleat clamping unit is surrounded by the first sole engaging member, the second sole engaging member, the first bridge member and the second bridge member.

22. The pedal according to claim 9 wherein the second sole engaging member includes a second opening for receiving the axle therein.

23. A bicycle pedal comprising:

an axle;

a cleat clamping unit mounted to the axle for rotation about the axle;

wherein the cleat clamping unit includes a front cleat engaging member and a rear cleat engaging member, wherein the front cleat engaging member and the rear cleat engaging member face each other;

a first sole engaging member having a first sole engaging surface, the first sole engaging member being disposed at a lateral side of the clamping unit and having an opening for receiving the axle therethrough;

a second sole engaging member formed separately from the first sole engaging member and having a second sole engaging surface, the second sole engaging member being disposed at an opposite lateral side of the clamping unit;

wherein the first sole engaging member and the second sole engaging member each extend beyond front and rear sides of the clamping unit;

wherein the first sole engaging member and the second sole engaging member each have a lateral outer side which tapers inwardly from a central portion thereof;

a unitary first bridge member formed separately from the first sole engaging member and the second sole engaging member, wherein the first bridge member is mounted by first screws to a front surface of the first sole engaging member that faces in a forward direction and to a front surface of the second sole engaging member that faces in a forward direction, and wherein the first bridge member has a rear first bridge member surface that faces the front surface of the first sole engaging member that faces in the forward direction and the front surface of the second sole engaging member that faces in the forward direction; and a unitary second bridge member formed separately from the first sole engaging member, the second sole engaging member and the first bridge member, wherein the second bridge member is mounted by second screws to a rear surface of the first sole engaging member that faces in a rearward direction and to a rear surface of the second sole engaging member that faces in a rearward direction, and wherein the second bridge member has a front second bridge member surface facing the rear surface of the first sole engaging member that faces in the rearward direction and the rear surface of the second sole engaging member that faces in the rearward direction; and wherein the cleat clamping unit is surrounded by the first sole engaging member, the second sole engaging member, the first bridge member and the second bridge member.

24. The pedal according to claim 23 wherein the first sole engaging member is shaped symmetrically to the second sole engaging member.

25. The pedal according to claim 23 wherein the first bridge member is formed as a first flat plate-shaped member having a front first bridge member surface parallel to the rear first bridge member surface, and wherein the second bridge member is formed as a second flat plate-shaped member having a rear second bridge member surface parallel to the front second bridge member surface.

26. The pedal according to claim 23 wherein the first bridge member and the second bridge member have the same shape.

27. The pedal according to claim 23 wherein the first sole engaging member and the second sole engaging member each include a lateral inner side having a portion which extends in a straight line from the central portion and perpendicular to the axle.

28. The pedal according to claim 23 wherein the second sole engaging member includes a second opening for receiving the axle therein.

* * * * *